US011645120B2

(12) United States Patent
Enrici

(10) Patent No.: US 11,645,120 B2
(45) Date of Patent: May 9, 2023

(54) MEMORY BANDWIDTH ALLOCATION FOR MULTI-TENANT FPGA CLOUD INFRASTRUCTURES

(71) Applicant: Nokia Solutions and Networks Oy, Espoo (FI)

(72) Inventor: Andrea Enrici, Bourg la Reine (FR)

(73) Assignee: Nokia Solutions and Networks Oy, Espoo (FI)

( * ) Notice: Subject to any disclaimer, the term of this patent is extended or adjusted under 35 U.S.C. 154(b) by 202 days.

(21) Appl. No.: 17/171,256

(22) Filed: Feb. 9, 2021

(65) Prior Publication Data

US 2022/0253482 A1 Aug. 11, 2022

(51) Int. Cl.
*G06F 9/50* (2006.01)

(52) U.S. Cl.
CPC .......... *G06F 9/5038* (2013.01); *G06F 9/5016* (2013.01)

(58) Field of Classification Search
CPC ...................................................... G06F 9/5038
See application file for complete search history.

(56) References Cited

U.S. PATENT DOCUMENTS

2020/0249928 A1\* 8/2020 Zeng ........................ G06F 8/656

OTHER PUBLICATIONS

Extended European Search Report dated Mar. 16, 2022 issued in corresponding European Patent Application No. 21203340.

Bertolino Matteo et al., "Efficient Scheduling of FPGAs for Cloud Data Center Infrastructures," 2020 23rd Euromicro Conference on Digital System Design (DSD), IEEE, Aug. 26, 2020, pp. 57-64.
Wu Y-H et al., "Heuristic algorithm for the resource-constrained scheduling problem during high-level synthesis," IET Computers and Digital Techniques, vol. 3, No. 1, Jan. 12, 2009, pp. 43-51.
Shanker Kripa et al., "Theory and Methodology a branch and bound based heuristic for multi-product resource constrained scheduling problem in FMS environment," Jan. 1, 1999.
Cormen Thomas H et al., "Introduction to Algorithms (Third Edition)—VI Graph algorithms," Jan. 1, 2009.
Chen, F. et al. "Enabling FPGAs in the Cloud." *Computing Frontiers* (2014).
Dunning, I. et al. "What Works Best When? A Systematic Evaluation of Heuristics for Max-Cut and QUBO." *Informs Journal on Computing*, vol. 30, No. 3 (2018): pp. 608-624.
Eyraud-Dubois, L. et al. "Parallel scheduling of task trees with limited memory." Research Report No. 8606, Oct. 2014, Project-Team ROMA, Research Centre Grenoble-Rhône-Alpes: pp. 1-34.
Kapoor, S. et al. "An Algorithm for Enumerating All Spanning Trees of a Directed Graph." *Algorithmica* (1996): pp. 1-16.

(Continued)

*Primary Examiner* — Charlie Sun
(74) *Attorney, Agent, or Firm* — Harness, Dickey & Pierce, P.L.C.

(57) ABSTRACT

A network device, including processing circuitry configured to determine a depth first search tree (DFST) based on a dependency graph included in a request to allocate memory bandwidth to a set of tasks, determine a set of groups of edges and nodes in the dependency graph based on the DFST, and allocate the memory bandwidth to the set of tasks by allocating the memory bandwidth to edges included in the set of groups of edges and nodes.

20 Claims, 5 Drawing Sheets

(56) References Cited

OTHER PUBLICATIONS

Kayaaslan, E. et al. "Scheduling series-parallel task graphs to minimize peak memory." *Theoretical Computer Science*, Elsevier vol. 707 (2018): pp. 1-23.
Liu, J.W.H. "An Application of Generalized Tree Pebbling to Sparse Matrix Factorization." *SIAM J. Alg. Disc. Meth.*, vol. 8, No. 3 (1987): pp. 375-395.
Liu, J.W.H. "On the Storage Requirement in the Out-of-Core Multifrontal Method for Sparse Factorization." *ACM Transactions on Mathematical Software*, vol. 12, No. 3 (1986): pp. 249-264.
Reif, J.H. "Depth-First Search is Inherently Sequential." *Information Processing Letters*, vol. 20, No. 5 (1985): pp. 229-234.
"Switch to data center networking your way, Nokia Data Center Fabric solution." Nokia (2020).
European Office Action dated Mar. 2, 2023 issued in corresponding European Appln. No. 21203340.1.

\* cited by examiner

MEMORY BANDWIDTH ALLOCATION FOR MULTI-TENANT FPGA CLOUD INFRASTRUCTURES

BACKGROUND

A field-programmable gate array (FPGA) is an integrated circuit designed to be configured or re-configured after manufacture. FPGAs contain an array of Configurable Logic Blocks (CLBs), and a hierarchy of reconfigurable interconnects that allow these blocks to be wired together, like many logic gates that can be inter-wired in different configurations. CLBs may be configured to perform complex combinational functions, or simple logic gates like AND and XOR. CLBs also include memory blocks, which may be simple flip-flops or more complete blocks of memory, and specialized Digital Signal Processing blocks (DSPs) configured to execute some common operations (e.g., filters).

SUMMARY

The scope of protection sought for various example embodiments of the disclosure is set out by the independent claims. The example embodiments and/or features, if any, described in this specification that do not fall under the scope of the independent claims are to be interpreted as examples useful for understanding various embodiments.

One or more example embodiments provide a field-programmable gate array (FPGA) architecture that may enable improved memory bandwidth allocation for multi-tenant workloads that execute on FPGA nodes.

At least one example embodiment provides a network device comprising: processing circuitry configured to determine a depth first search tree (DFST) based on a dependency graph included in a request to allocate memory bandwidth to a set of tasks, determine a set of groups of edges and nodes in the dependency graph based on the DFST, and allocate the memory bandwidth to the set of tasks by allocating the memory bandwidth to edges included in the set of groups of edges and nodes.

The dependency graph may include annotations of characteristics and metadata.

The processing circuitry may be further configured to obtain a plurality of DFSTs based on the dependency graph, and select the DFST from the plurality of DFSTs based on a number of non-DFST edges (e.g., retreating edges) in each of the plurality of DFSTs.

The processing circuitry may be further configured to generate a preliminary DFST based on the dependency graph, generate a plurality of candidate DFSTs by performing exchanges of edges of the preliminary DFST, and filter the plurality of candidate DFSTs based on non-DFST edges (e.g., cross edges) of each of the plurality of candidate DFSTs to obtain the plurality of DFSTs.

The dependency graph may be a cyclic dependency graph.

The processing circuitry may be further configured to compute a plurality of groups of edges and nodes, and select the set of groups of edges and nodes from the plurality of groups of edges and nodes based on a network service makespan of each group of edges and nodes in the plurality of groups of edges and nodes.

The processing circuitry may be further configured to generate an ordered list of nodes in the DFST, partition the ordered list of nodes into at least two disjoint sets such that (i) a weight of edges in each of the at least two disjoint sets is less than or equal to a threshold memory capacity, and (ii) a number of memory access operations associated with the edges included in each of the at least two disjoint sets is less than a number of memory access ports in a target memory, and compute at least a first of the plurality of groups of edges and nodes based on the at least two disjoint sets.

At least one example embodiment provides a network device comprising: means for determining a depth first search tree (DFST) based on a dependency graph included in a request to allocate memory bandwidth to a set of tasks; means for determining a set of groups of edges and nodes in the dependency graph based on the DFST; and means for allocating the memory bandwidth to the set of tasks by allocating the memory bandwidth to edges included in the set of groups of edges and nodes.

At least one example embodiment provides a method for allocating memory bandwidth based on a dependency graph included in a request to allocate memory bandwidth to a set of tasks. The method comprises: determining a depth first search tree (DFST) based on the cyclic dependency graph; determining a set of groups of edges and nodes in the cyclic dependency graph based on the DFST; and allocating the memory bandwidth the set of tasks by allocating the memory bandwidth to the edges included in the set of groups of edges and nodes.

At least one example embodiment provides a non-transitory computer-readable storage medium storing computer-readable instructions that, when executed cause processing circuitry to perform a method for allocating memory bandwidth based on a cyclic dependency graph included in a request to allocate memory bandwidth to a set of tasks. The method comprises: determining a depth first search tree (DFST) based on the cyclic dependency graph; determining a set of groups of edges and nodes in the cyclic dependency graph based on the DFST; and allocating the memory bandwidth to the set of tasks by allocating the memory bandwidth to the edges included in the set of groups of edges and nodes.

BRIEF DESCRIPTION OF THE DRAWINGS

Example embodiments will become more fully understood from the detailed description given herein below and the accompanying drawings, wherein like elements are represented by like reference numerals, which are given by way of illustration only and thus are not limiting of this disclosure.

Figure 1:
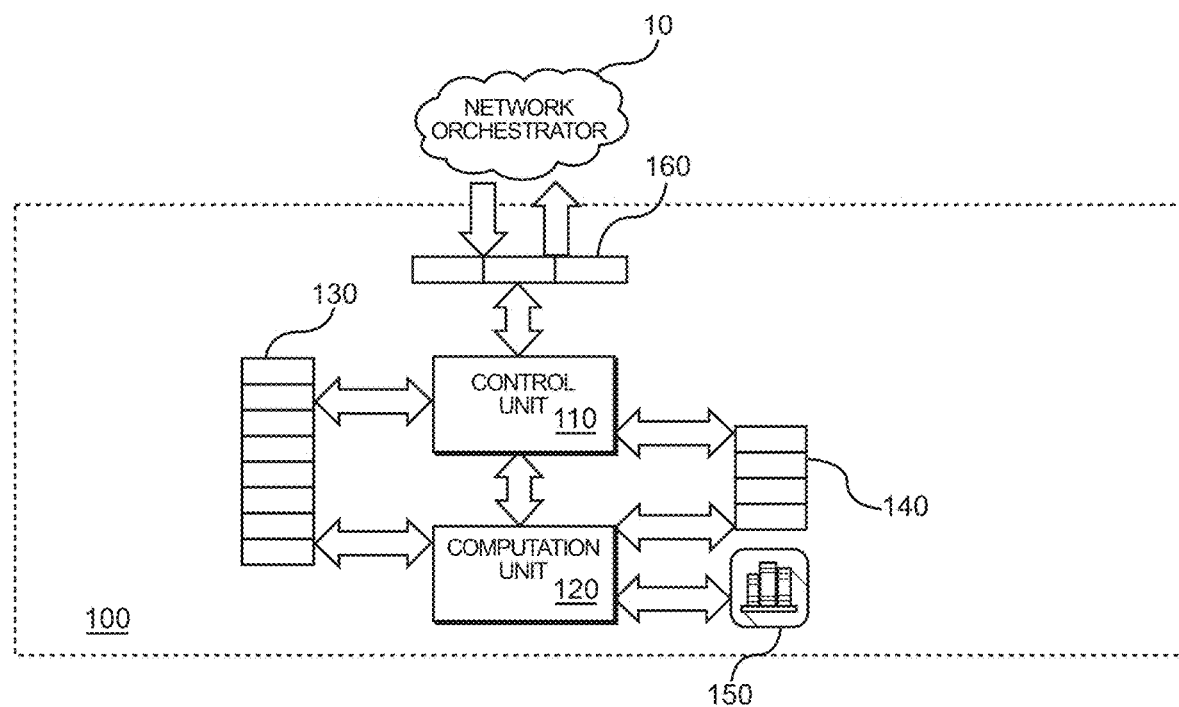
FIG. 1 is a block diagram illustrating a logical configuration of a memory bandwidth allocator according to example embodiments.

It should be noted that these figures are intended to illustrate the general characteristics of methods, structure and/or materials utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments. The use

DETAILED DESCRIPTION

Various example embodiments will now be described more fully with reference to the accompanying drawings in which some example embodiments are shown.

Detailed illustrative embodiments are disclosed herein. However, specific structural and functional details disclosed herein are merely representative for purposes of describing example embodiments. The example embodiments may, however, be embodied in many alternate forms and should not be construed as limited to only the embodiments set forth herein.

Accordingly, while example embodiments are capable of various modifications and alternative forms, the embodiments are shown by way of example in the drawings and will be described herein in detail. It should be understood, however, that there is no intent to limit example embodiments to the particular forms disclosed. On the contrary, example embodiments are to cover all modifications, equivalents, and alternatives falling within the scope of this disclosure. Like numbers refer to like elements throughout the description of the figures.

In modern cloud-based data centers, servers are equipped with reconfigurable hardware (e.g., field-programmable gate arrays (FPGAs)), which is used to accelerate the computation of data-intensive or time-sensitive applications.

FPGA reconfigurability is referred to as "partial reconfiguration," which supposes that parts of FPGA hardware may be reconfigured while the FPGA is running. The partial reconfiguration is performed on allocated portions of a FPGA chip (or FPGA reconfigurable logic), which are known as "partial reconfiguration slots."

FPGAs include different types of memories implemented by different technologies. The term memory, when used herein, may refer to any physical memory that is shared by functions that compose a workload executed by an FPGA. The physical memory may include, for example, Flash memory, on-chip blocks of RAM, off-chip blocks of RAM, etc. The term memory, when used herein, may also refer to any physical memory whose access can be controlled and/or programmed by a user by means of programming languages and/or hardware design languages.

FPGA memory bandwidth may be allocated based on a dependency graph for network services. Allocation of FPGA memory bandwidth may refer to, e.g., allocating a portion of the maximum rate at which data may be read/written from/to a memory. The dependency graph may model data dependencies between network functions or services.

In one example, a dependency graph G may be in the form of a directed finite flow graph. A directed finite flow graph may be an ordered triple G=(V, E, s) where V is a finite set comprised of vertices (also referred to as nodes and/or points), E is a set of ordered pairs of vertices (e.g., denoted as (x,y) for vertices x and y), and s is a start or source vertex such that every node in V is reachable by at least one path from s. Nodes in V denote units of work (e.g., tasks, jobs, etc.). Edges in E denote precedence constraints (dependencies); for instance, edge (x,y) means that task x must be executed before task y.

A directed finite flow graph (also referred to as a di-graph or a flow graph) G is cyclic if it contains at least one trail where some vertices are repeated. A trail is a finite sequence of unique edges which joins a sequence of vertices. A path is a trail in which all vertices are distinct. A cyclic path is a trail where some vertices may be repeated. Given two nodes (x,y) in G, x is said to dominate y if (e.g., if and only if) every path from s to y includes x.

Dependency graphs may be annotated. In one example, edges of dependency graphs may be annotated with a positive integer number n that denotes the input/output memory consumed/produced by a node upon execution, and nodes of dependency graphs may be annotated with timing characteristics (e.g., processing time of tasks). However, example embodiments should not be limited to this example and other graph annotations are also possible. Further, graph transformations may be used to transform an annotated graph into a different annotation form.

In some cases, a dependency graph may be a cyclic graph. Cyclic graphs are frequently encountered in modern parallel applications (e.g., telecommunications, machine learning, video/image processing, etc.). Cyclic graphs contain cyclic paths. Some cyclic graphs for these applications have an additional property (e.g., irreducible or unstructured cycles or loops) that makes them harder to analyze for scheduling purposes. A cyclic graph having an irreducible or unstructured cycle is a cyclic graph whose set of edges E cannot be partitioned in two sets $E_1$, $E_2$ such that $(G,E_1,s)$ is a directed acyclic graph of G and for each edge (x,y) in $E_2$, y dominates x in G. Informally, the nodes in an irreducible or unstructured cycle have more than one entry and/or exit edge and can be accessed by more than one path in the graph. Graphs with this property are frequently called irreducible or unstructured graphs. These graphs may add more complexity to scheduling and memory related problems. Moreover, because of cycles, nodes can be ordered in multiple ways.

A topological sort or topological ordering may be performed on a directed graph to determine an execution order in which to perform the jobs defined in the directed graph. Topological ordering of a directed graph is a linear ordering of its vertices such that for every directed edge (u, v) (from vertex u to vertex v), u comes before v in the ordering. Such a strict topological ordering is possible only if the graph is acyclic. If the graph contains cycles, multiple orderings exist, that are not topological, and that impact the properties (e.g., latency, memory bandwidth allocation, etc.) of a scheduling (e.g., execution order of nodes in a flow graph).

An example algorithm for computing a scheduling (or execution order) for tasks in a flow graph is the Depth First Search (DFS). A DFS of a directed graph may be represented by a type of spanning tree referred to as a depth first search tree (DFST). Based on this spanning tree, the edges of the original graph may be divided into three classes: forward edges, which point from a node of the tree to one of its descendants, retreating edges, which point from a node to one of its ancestors, and cross edges, which do neither.

In general, multiple DFSTs exist for a dependency graph, with or without cycles, reducible or irreducible. Thus, different DFSTs correspond to different schedulings with different properties.

A dependency graph may contain special nodes that denote reconfiguration tasks (e.g., the time spent to electrically configure the FPGA circuitry to execute one or more tasks). The input and output edges of such nodes are annotated with n=0 as the FPGA reconfiguration process does not consume memory. These nodes are annotated with the corresponding reconfiguration time (the larger the FPGA area to reconfigure, the larger the reconfiguration time).

Example embodiments provide methods and apparatuses for allocating FPGA memory bandwidth to the tasks (units of work) that compose a network service in cases where tasks have cyclic dependencies.

FIG. 1 is a block diagram illustrating a logical configuration of a memory bandwidth allocator (MBA) 100 (e.g., at a network device) according to example embodiments.

Referring to FIG. 1, the MBA 100 includes a control unit 110 and a computation unit 120. The control unit 110 and the computation unit 120 may include processing circuitry such as hardware including logic circuits; a hardware/software combination such as a processor executing software; or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc. Further, the computation unit 120 and the control unit 110 may be embodied as individual components, or may be included in a combined component including both the computation unit 120 and the control unit 110. The MBA 100 may be implemented at a server or other cloud-based network device.

The control unit 110 may be configured to communicate with a network orchestrator 10 and to manage a memory 130, internal control and status registers 140, a library of algorithms 150, and communication buffers 160. The control unit 110 may request the computation unit 120 to perform computations based on a request from the network orchestrator 10, and send a result of the computations to the network orchestrator 10. Example functionality of the control unit 110 will be discussed in more detail later.

The network orchestrator 10 may be configured to deploy requests including an annotated dependency graph G (or any other workload) to the MBA 100.

The communication buffers 160 may store input and/or output requests between the MBA 100 and the network orchestrator 10.

The internal control and status registers 140 may be a memory or portion thereof programmed with a code indicating a particular status of the MBA 100 (e.g., busy, ready to accept new job, etc.).

The computation unit 120 may be configured to execute computations related to determining a memory bandwidth allocation. Example functionality of the computation unit 120 will be discussed in more detail later.

The library of algorithms 150 may include algorithms for DFST and cut-set determination.

The memory 130 may be a computer readable storage medium that generally includes a random access memory (RAM), read only memory (ROM), and/or a permanent mass storage device, such as a disk or flash drive. The memory 130 may also store an operating system and any other routines/modules/applications for providing the functionalities of the MBA 100 to be executed by one or more processors, the control unit 110 and/or the computation unit 120. These software components may also be loaded from a separate computer readable storage medium into the memory 130 using a drive mechanism (not shown). Such separate computer readable storage medium may include a disc, tape, DVD/CD-ROM drive, memory card, or other like computer readable storage medium (not shown). Although illustrated separately, the library of algorithms 150 may be stored in the memory 130.

Figure 2:
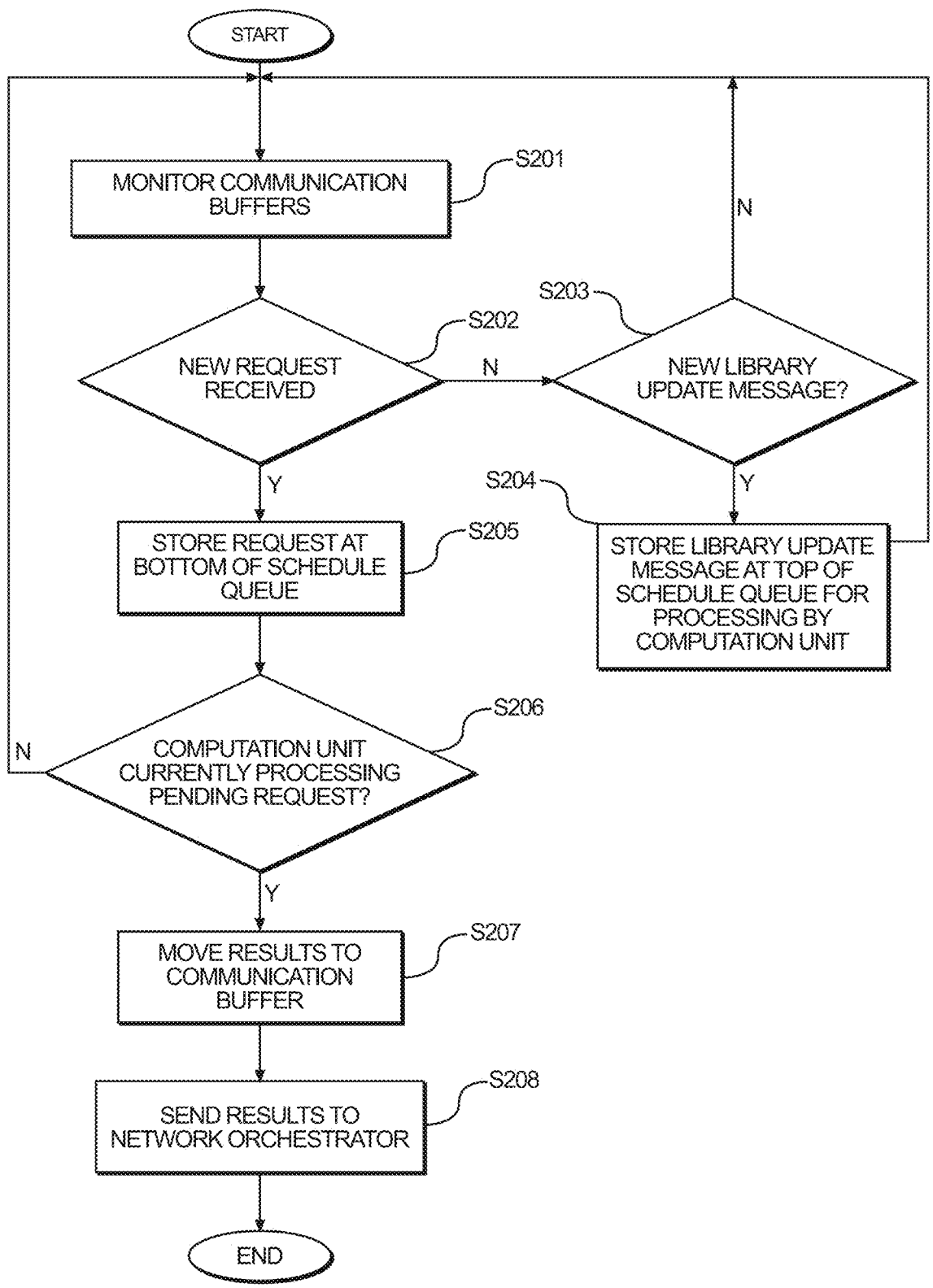
FIG. 2 is a flow chart illustrating a method according to example embodiments.

FIG. 2 is a flow chart illustrating a method for processing a request from the network orchestrator 10 according to example embodiments.

Referring to FIG. 2, at step S201, the controller 110 monitors the communication buffers 160 for new requests from the network orchestrator 10. A request from the network orchestrator 10 may include a dependency graph G annotated with characteristics (e.g., processing time of tasks, amount of data produced/consumed by tasks, etc.) and metadata (e.g., request ID, request priority, total available bandwidth of the target memory, characteristics of the target memory such as number of read and write ports, etc.). The dependency graph G may be formed by a union of dependency graphs for individual users.

Alternatively, the request may include a plurality of dependency graphs for a plurality of individual users. The network orchestrator 10 may obtain dependency graphs for individual users by, e.g., automatically extracting the dependency graphs from user specifications (e.g., programming languages, model-based specifications, etc.). However, the example embodiments are not limited to obtaining dependency graphs for individual users in this manner, and dependency graphs for individual users may be obtained by other methods. The MBA 100 may generate the dependency graph G based on a union of the plurality of dependency graphs for individual users in any suitable manner.

Metadata may be target independent or target specific. Target independent metadata are metadata associated with requests and network services regardless of the specific characteristics of the target hardware where the service runs (e.g., request ID, request priority, etc.). Target-specific metadata are metadata related to the specific hardware/software characteristics of a target hardware, such as a FPGA-based server (e.g., maximum available memory bandwidth, number of read and/or write ports, memory clock frequency, memory bus width, etc.). Target independent metadata are metadata dynamically generated by the network orchestrator 10 (e.g., when a new service is to be deployed). Target-specific metadata are available in internal data structures of the orchestrator 10 (e.g., Look-Up Tables, linked lists, hash maps, etc.) and are specified by the network owner/operator when the network hardware is initially configured. These metadata are dynamically updated when new hardware is installed, existing hardware is updated, etc.

At step S202, the controller 110 determines if a new request has been received from the network orchestrator 10. In one example, the network orchestrator 10 may send the new request to the controller 110 in response to a request to deploy a new network service, a new network slice, etc. (e.g., from a user).

If a new request has not been received from the network orchestrator 10, the controller 110 determines whether a new library-update message has been received from the network orchestrator 10 at step S203. A library-update message may include instructions for the computation unit 120 to update the library of algorithms 150.

If a new library-update message has been received, then, at step S204 the controller 110 stores the new library-update message at the top of a schedule queue for processing by the computation unit 120 in turn. The process then returns to step S201.

Returning to step S203, if a new library-update message has not been received, then the process returns to step S201.

Returning to step S202, if the controller 110 determines that a new request has been received, then, at step S205, the controller 110 stores the request in (e.g., at the bottom of) the schedule queue in memory 130.

At step S206, the controller 110 reads the status register 140 of the computation unit 120 to determine whether the computation unit 120 is currently processing a pending request.

If the controller 110 determines that the computation unit 120 is currently processing a pending request, then the controller 110 returns to step S201.

Returning to step S206, if the controller 110 determines that the computation unit 120 is not currently processing a pending request (e.g., has finished processing a prior pending request), then at step S207 the controller 110 moves the memory bandwidth allocation (generated by the processing of the request at the computation unit 120) and relevant metadata from the computation unit 120 to the communication buffer 160. Processing of the request by the computation unit 120 to generate the memory bandwidth allocation will be discussed in more detail later.

At step S208, the controller 110 sends the memory bandwidth allocation and the metadata from the communication buffer 160 to the network orchestrator 10. The controller 110 may send the memory bandwidth allocation and metadata to the network orchestrator 10 in any suitable manner.

Figure 3:
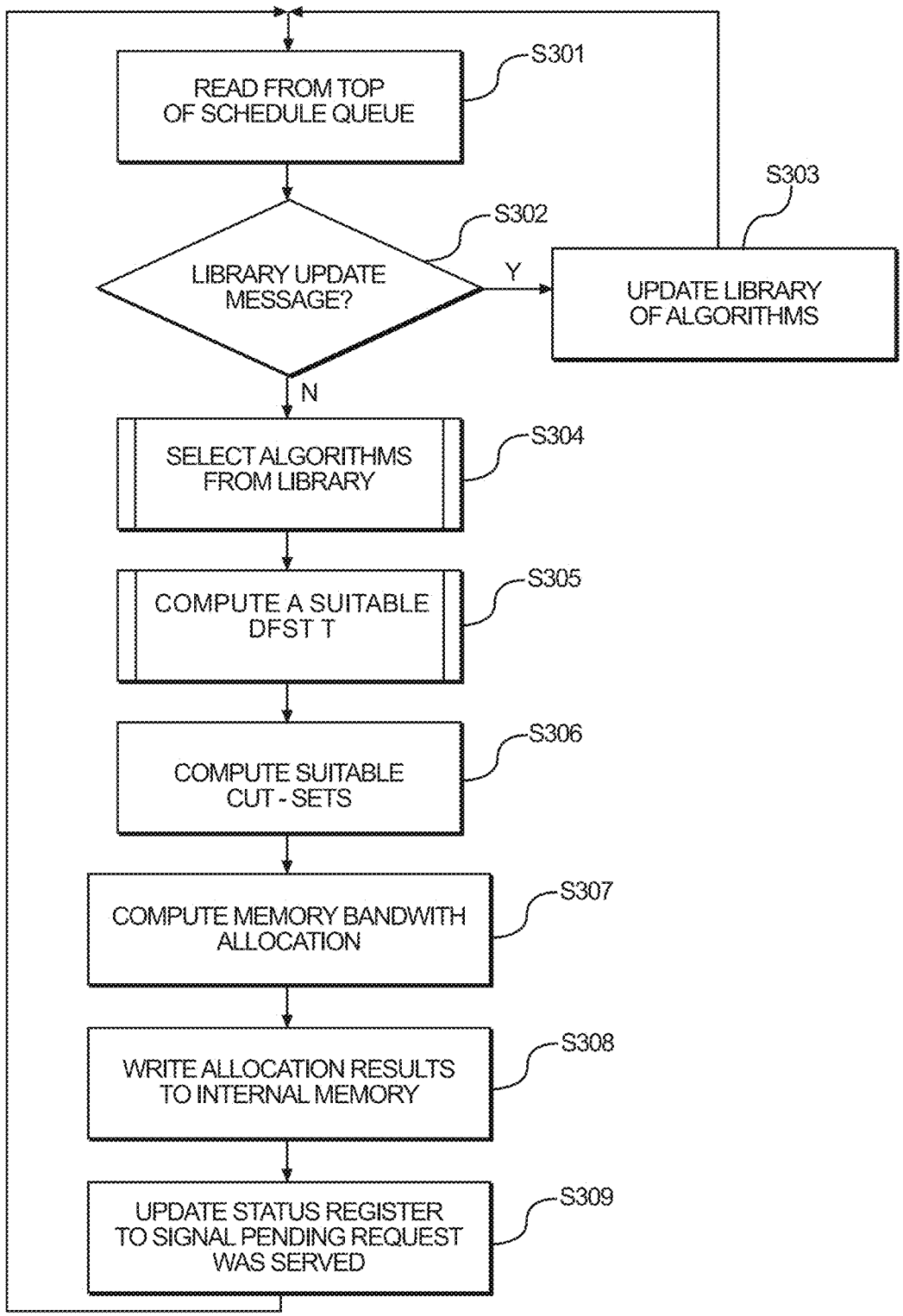
FIG. 3 is a flow chart illustrating another method according to example embodiments.

FIG. 3 is a flow chart illustrating a method of operating the computation unit 120 according to example embodiments.

Referring to FIG. 3, at step S301 the computation unit 120 reads the next entry from the top of the schedule queue.

At step S302, the computation unit 120 determines whether the entry at the top of the schedule queue is a library-update message. The computation unit 120 may determine whether an entry is a library-update message based on a communication protocol between the network orchestrator 10 and the MBA 100. For example, a set of request IDs (e.g., negative IDs) may be reserved to uniquely identify control messages such as library-update messages. These IDs cannot be assigned, at run-time, by the network orchestrator 10 to identify a request for a given network service.

If the entry at the top of the schedule queue is a library-update message, then the computation unit 120 may update the library of algorithms 150 at step S303. The computation unit 120 updates the library of algorithms 150 in a similar manner to a standard software update process (e.g., on a standard desktop PC). For example, executable code for new algorithms is installed in the memory 130. MBA internal control data structures (e.g., lookup tables, hash maps, linked lists, etc.) are updated to point to memory locations storing the new algorithms. If algorithms are to be removed from the library, their executable code is erased from the memory 130 and any reference to this code in the MBA internal control data structures is cleaned. If a new version of an algorithm already existing in the library is to be installed, the previous version of the executable code is removed from the memory 130 and the new version is installed. Once the library of algorithms 150 is updated, the process returns to step S301.

Returning to step S302, if the entry at the top of the schedule queue is not a library-update message, then the computation unit 120 determines that the entry is a new request from the network orchestrator 10 and proceeds to step S304.

At step S304, the computation unit 120 selects an algorithm from the library of algorithms 150 to explore depth first search trees of the dependency graph G included in the request from the network orchestrator 10, and an algorithm to compute cut-sets. Algorithms may be selected from the library of algorithms 150 based on the priority of a request. For high priority requests, algorithms which are known to run relatively fast (e.g., heuristics) may be selected. Conversely, for relatively low priority requests, slower but more precise solutions (e.g., enumerations) may be selected.

At step S305, the computation unit 120 processes the dependency graph G to compute a DFST T that reduces (or minimizes) a number of retreating edges that retro-propagate information in the dependency graph G. An example embodiment of a method for computing the DFST T will be discussed in more detail with regard to FIG. 4.

At step S306, based on the DFST T, the computation unit 120 computes cut-sets in the dependency graph G for which the weight of cross-edges fits a memory capacity.

A cut is a partition of the nodes in a DFST into two disjoint subsets. A cut determines a cut-set. A cut-set is a set of edges that have one endpoint in each subset of the partition caused by a cut. In order to make a cut to partition the nodes into two disjoint subsets, the weight of edges in the resulting cut-set must be less than or equal to the capacity of the target memory (threshold memory capacity), and a number of memory access (e.g., read/write) operations associated with the edges must correspond to (e.g., be less than or equal to) the number of memory I/O ports (e.g., read/write ports) in the target memory. A method for computing of the cut-sets according to example embodiments will be discussed in more detail later with regard to FIG. 5.

At step S307, the computation unit 120 allocates memory bandwidth to the edges in the cut-sets computed in step S306. The bandwidth may be allocated to each edge proportional to the edge's weight. The weight of an edge is represented as a positive integer n that is annotated to the edge, and may represent the input/output memory consumed/produced by a node (e.g., task) upon execution.

At step S308, the computation unit 120 writes the memory bandwidth allocation to the memory 130. The allocation of memory bandwidth may be simply represented by a Look-Up Table (LUT), where each entry is a pair <edge, b>, where b is the allocated bandwidth and edge is a cross-cut edge.

At step S309, the computation unit 120 updates the status register of the computation unit 120 to notify the control unit 110 that the processing of a request is complete.

Figure 4:
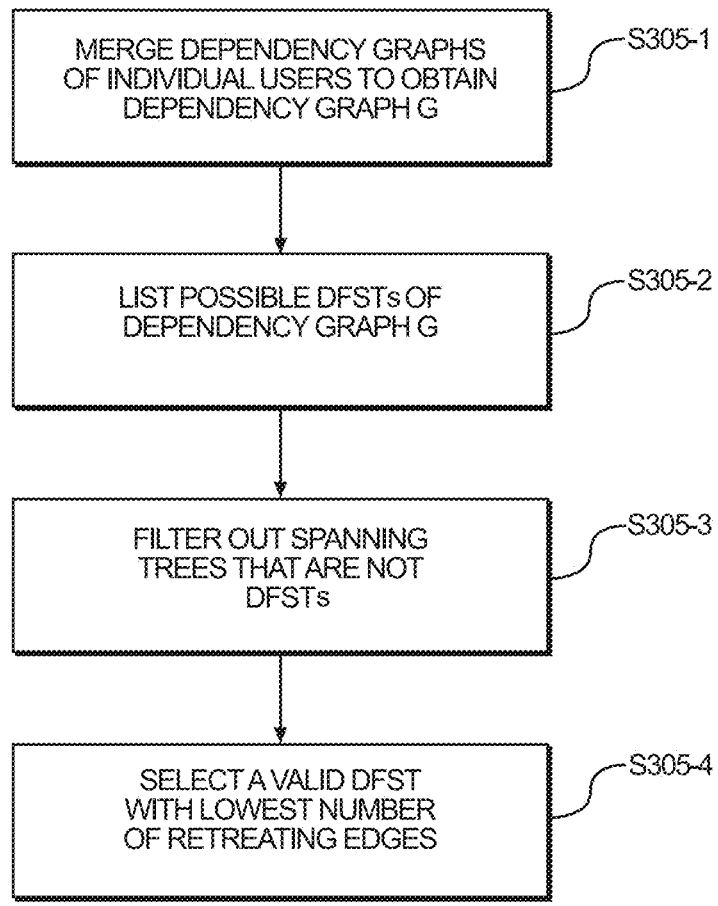
FIG. 4 is a flow chart illustrating another method according to example embodiments.

FIG. 4 is a flow chart illustrating a method for computing a DFST at step S305 in FIG. 3, according to example embodiments.

Referring to FIG. 4, at step S305-1 the computation unit 120 merges the dependency graphs of individual users to obtain the dependency graph G. The computation unit 120 may merge the dependency graphs according to any known manner of merging (e.g., forming a union) of dependency graphs. Alternatively, as discussed above, if the request includes the dependency graph G step S305-1 may be omitted.

At step S305-2 the computation unit 120 lists possible DFSTs (e.g., all possible DFSTs) of the dependency graph G by producing a first (or preliminary) DFST of the dependency graph G and producing spanning trees of the first DFST (e.g., all spanning trees of the first DFST) by performing exchanges of edges (e.g., all possible exchanges of edges) of the first DFST. Possible DFSTs may also be referred to as candidate DFSTs.

At step S305-3, the computation unit 120 filters out spanning trees produced in step S305-2 that are not DFSTs by verifying order relations on cross edges of the flow graph G. Each cross edge of a dependency graph G that has been visited in a Depth-First Search (DFS) expresses a partial order relation concerning the DFS visitation order of nodes in the DFST for dependency graph G. A cross edge from node a to node b means that the DFS algorithm visited b before a. To verify order relations, the computation unit 120 verifies that all cross edges' relations correspond to a valid total order relation. For instance, a DFS visitation of dependency graph G cannot produce the cross edges (a,b) and (b,a) as this does not correspond to a valid DFS visitation order.

Still referring to FIG. 4, at step S305-4, the computation unit 120 selects a valid DFST T from among the spanning trees determined to be DFSTs (set of DFSTs) in step S305-3. In one example, the computation unit 120 may use heuristics to select a DFST T. In this example, the computation unit 120 may retrieve a heuristic from the library of algorithms 150. For example, a heuristic may be an algorithm that computes a DFST T, where each node is added to the DFST T based on a topological metric (e.g., number of input/output edges).

In another example, the computation unit 120 explores the acyclic paths in the dependency graph G and computes a value d, which is a maximum number of retreating edges in the DFST T on the acyclic paths. Then, the computation unit 120 selects the DFST T with the lowest d. As discussed herein, the retreating edges and cross edges may be collectively referred to as non-DFST edges.

The computation unit 120 may allocate resources (e.g., time) to computing the value d based on the priority of the memory bandwidth allocation request. For example, if a request has a low priority the computation unit 120 may spend relatively more time in determining the DFST with the lowest value d. Conversely, for high priority requests (that must be served rapidly) the computation unit 120 may simply randomly select one DFST and compute cut-sets on that DFST, even if it is not the DFST with the lowest d.

It is possible for multiple DFSTs computed in this way to have a same lowest value d. In a case where the computation unit 120 determines that there are multiple DFSTs that have a same lowest value d, the computation unit 120 may randomly select one DFST T having the lowest value d. However, example embodiments are not limited thereto and the computation unit 120 may select a DFST T from the multiple DFSTs having a same lowest value d according to one or more other topological criteria. For example, the computation unit 120 may select the DFST T having the largest number of leaves of the DFSTs having the same lowest value d, the computation unit 120 may select the DFST T having a highest degree of the DFSTs having the same lowest value d, etc.

Figure 5:
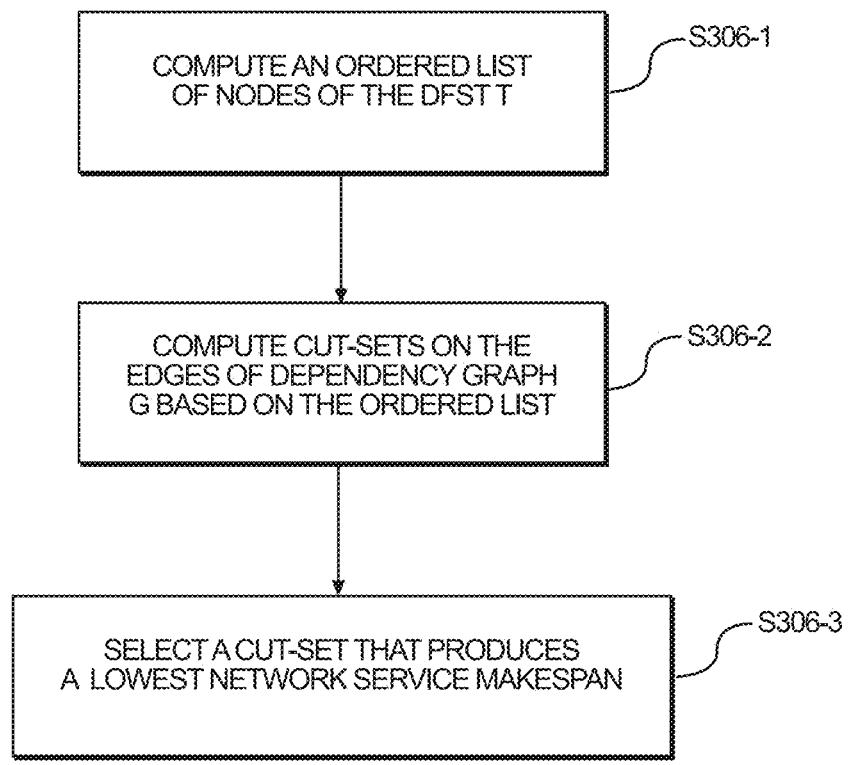
FIG. 5 is a flow chart illustrating another method according to example embodiments.

FIG. 5 is a flow chart illustrating a method for computing cut-sets of the dependency graph G at step S306 in FIG. 3, according to example embodiments.

Referring to FIG. 5, at step S306-1 the computation unit 120 computes an ordered list of nodes on the selected (e.g. valid) DFST T (e.g., a reverse-post order) to produce an ordered list of nodes l. The ordered list of nodes may be l=<$n_0$, $n_3$, $n_5$, . . . , $n_1$, . . . , > where each of $n_0$, $n_1$, $n_3$, $n_5$, etc. represents a node of the DFST T. However, the nodes $n_0$, $n_1$, $n_3$, and $n_5$ are only presented as an example of nodes that may be included in the ordered list of nodes l. The ordered list of nodes l may be computed by means of a DFS algorithm that labels nodes while visiting the dependency graph G. The resulting labeling gives an order for nodes. However, other known methods for computing the ordered list of nodes l may be used, and the example embodiments should not be limited to any particular method.

At step S306-2, the computation unit 120 computes cut-sets for the dependency graph G based on the ordered list of nodes l such that an allocation of memory bandwidth based on the cut-sets fits into the capacity of the target memory. The computation unit 120 considers each node of the ordered list of nodes l one by one and determines cut-sets based on the output edges of each node. The computation unit 120 performs cuts on the edges in the dependency graph G, based on the determined cut-sets, such that each cut leaves a node in the ordered list of nodes l.

Multiple cut-sets may exist that fit into the capacity of the target memory. Computing cut-sets that fit into the capacity of the target memory is a problem that is NP-complete. According to example embodiments, the computation unit 120 may enumerate at most M cut-sets that meet the memory capacity requirement. Here M is a parameter configured by the network orchestrator 10 according to how fast the network orchestrator 10 requests the MBA 100 to produce a solution. M may be a positive integer related to the priority of the memory bandwidth allocation request. For instance, M≤4 for high priority requests that must be rapidly served by the MBA 100; larger values of M>4 may be suitable for low priority requests where the MBA 100 allocates more resources (e.g., time) in computing the memory bandwidth allocation. However, example embodiments are not limited thereto and the computation unit 120 may compute the cut-sets in a different manner. The computation unit 120 may retrieve an algorithm for computing the cut-sets from the library of algorithms 150.

At step S306-3, the computation unit 120 selects a cut-set of the M cut-sets which minimizes the network service makespan (e.g., the completion time). According to one or more example embodiments, the computation unit 120 may compute a network service makespan for each of the M cut-sets, and select the cut-set from among the M cut-sets with the lowest network service makespan.

The cut-set with the lowest network service makespan may be the cut-set whose cuts (e.g., partitions of the nodes in the initial dependency graph) yield the minimal average critical path of the cut-sets M. The computation unit 120 may calculate the average critical path (AVG_CRIT_PATH) of the cut-sets M according to Equation (1) shown below.

$$\text{AVG\_CRIT\_PATH} = \sum_{k=1}^{n} \frac{c_k}{n} \quad (1)$$

In Equation (1), $C_k$ is the critical path of the k-th cut and n is the number of cuts. The critical path of a cut-set of directed graph G is the path starting at the cut-set's source and ending at the cut-set's sink, for which the sum of the nodes' execution times (within the path) is the largest, among all candidate source-to-sink paths.

It is possible for multiple cut-sets computed in this way to have a same minimal makespan. In this case, additional optimization criteria may be used for selecting the cut-set from among the M cut-sets (e.g., choosing one of the cut-sets having the same minimal makespan randomly, choosing the cut-set that minimizes power consumption of nodes from the cut-sets having the same minimal makespan, etc.).

Example embodiments may allocate FPGA memory bandwidth to tasks (units of work) that compose a network service based on the computed cut-sets. Example embodiments may compute cut-sets such that the allocation of the FPGA memory bandwidth may be allocated to reduce or minimize peak memory consumption and/or reduce or minimize a network service (application) makespan. Reducing the peak memory consumption may reduce or prevent use of relatively low bandwidth memory and decrease latency. Reducing the makespan may reduce the latency of network services.

Although the terms first, second, etc. may be used herein to describe various elements, these elements should not be limited by these terms. These terms are only used to distinguish one element from another. For example, a first element could be termed a second element, and similarly, a second element could be termed a first element, without departing from the scope of this disclosure. As used herein, the term "and/or," includes any and all combinations of one or more of the associated listed items.

When an element is referred to as being "connected," or "coupled," to another element, it can be directly connected or coupled to the other element or intervening elements may be present. By contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Specific details are provided in the following description to provide a thorough understanding of example embodiments. However, it will be understood by one of ordinary skill in the art that example embodiments may be practiced without these specific details. For example, systems may be shown in block diagrams so as not to obscure the example embodiments in unnecessary detail. In other instances, well-known processes, structures and techniques may be shown without unnecessary detail in order to avoid obscuring example embodiments.

As discussed herein, illustrative embodiments will be described with reference to acts and symbolic representations of operations (e.g., in the form of flow charts, flow diagrams, data flow diagrams, structure diagrams, block diagrams, etc.) that may be implemented as program modules or functional processes include routines, programs, objects, components, data structures, etc., that perform particular tasks or implement particular abstract data types and may be implemented using existing hardware at, for example, existing network apparatuses, elements or entities including cloud-based data centers, computers, cloud-based servers, or the like. Such existing hardware may be processing or control circuitry such as, but not limited to, one or more processors, one or more Central Processing Units (CPUs), one or more controllers, one or more arithmetic logic units (ALUs), one or more digital signal processors (DSPs), one or more microcomputers, one or more field programmable gate arrays (FPGAs), one or more System-on-Chips (SoCs), one or more programmable logic units (PLUs), one or more microprocessors, one or more Application Specific Integrated Circuits (ASICs), or any other device or devices capable of responding to and executing instructions in a defined manner.

Although a flow chart may describe the operations as a sequential process, many of the operations may be performed in parallel, concurrently or simultaneously. In addition, the order of the operations may be re-arranged. A process may be terminated when its operations are completed, but may also have additional steps not included in the figure. A process may correspond to a method, function, procedure, subroutine, subprogram, etc. When a process corresponds to a function, its termination may correspond to a return of the function to the calling function or the main function.

As disclosed herein, the term "storage medium," "computer readable storage medium" or "non-transitory computer readable storage medium" may represent one or more devices for storing data, including read only memory (ROM), random access memory (RAM), magnetic RAM, core memory, magnetic disk storage mediums, optical storage mediums, flash memory devices and/or other tangible machine-readable mediums for storing information. The term "computer-readable medium" may include, but is not limited to, portable or fixed storage devices, optical storage devices, and various other mediums capable of storing, containing or carrying instruction(s) and/or data.

Furthermore, example embodiments may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a computer readable storage medium. When implemented in software, a processor or processors will perform the necessary tasks. For example, as mentioned above, according to one or more example embodiments, at least one memory may include or store computer program code, and the at least one memory and the computer program code may be configured to, with at least one processor, cause a network apparatus, network element or network device to perform the necessary tasks. Additionally, the processor, memory and example algorithms, encoded as computer program code, serve as means for providing or causing performance of operations discussed herein.

A code segment of computer program code may represent a procedure, function, subprogram, program, routine, subroutine, module, software package, class, or any combination of instructions, data structures or program statements. A code segment may be coupled to another code segment or a hardware circuit by passing and/or receiving information, data, arguments, parameters or memory contents. Information, arguments, parameters, data, etc. may be passed, forwarded, or transmitted via any suitable technique including memory sharing, message passing, token passing, network transmission, etc.

The terms "including" and/or "having," as used herein, are defined as comprising (i.e., open language). The term "coupled," as used herein, is defined as connected, although not necessarily directly, and not necessarily mechanically. Terminology derived from the word "indicating" (e.g., "indicates" and "indication") is intended to encompass all the various techniques available for communicating or referencing the object/information being indicated. Some, but not all, examples of techniques available for communicating or referencing the object/information being indicated include the conveyance of the object/information being indicated, the conveyance of an identifier of the object/information being indicated, the conveyance of information used to generate the object/information being indicated, the conveyance of some part or portion of the object/information being indicated, the conveyance of some derivation of the object/information being indicated, and the conveyance of some symbol representing the object/information being indicated.

According to example embodiments, network apparatuses, elements or entities including cloud-based data centers, computers, cloud-based servers, or the like, may be (or include) hardware, firmware, hardware executing software or any combination thereof. Such hardware may include processing or control circuitry such as, but not limited to, one or more processors, one or more CPUs, one or more controllers, one or more ALUs, one or more DSPs, one or more microcomputers, one or more FPGAs, one or more SoCs, one or more PLUs, one or more microprocessors, one or more ASICs, or any other device or devices capable of responding to and executing instructions in a defined manner.

Benefits, other advantages, and solutions to problems have been described above with regard to specific embodiments of the invention. However, the benefits, advantages, solutions to problems, and any element(s) that may cause or result in such benefits, advantages, or solutions, or cause such benefits, advantages, or solutions to become more pronounced are not to be construed as a critical, required, or essential feature or element of any or all the claims.

Reference is made in detail to embodiments, examples of which are illustrated in the accompanying drawings, wherein like reference numerals refer to the like elements throughout. In this regard, the example embodiments may have different forms and should not be construed as being limited to the descriptions set forth herein. Accordingly, the example embodiments are merely described below, by referring to the figures, to explain example embodiments of the present description. Aspects of various embodiments are specified in the claims.

What is claimed is:

1. A network device comprising:
   processing circuitry configured to
   determine a depth first search tree (DFST) based on a dependency graph included in a request to allocate memory bandwidth to a set of tasks,
   determine a set of groups of edges and nodes in the dependency graph based on the DFST, and
   allocate the memory bandwidth to the set of tasks by allocating the memory bandwidth to edges included in the set of groups of edges and nodes.

2. The network device of claim 1, wherein the dependency graph includes annotations of characteristics and metadata.

3. The network device of claim 1, wherein the processing circuitry is configured to
   obtain a plurality of DFSTs based on the dependency graph, and
   select the DFST from the plurality of DFSTs based on a number of non-DFST edges in each of the plurality of DFSTs.

4. The network device of claim 3, wherein the processing circuitry is configured to
   generate a preliminary DFST based on the dependency graph,
   generate a plurality of candidate DFSTs by performing exchanges of edges of the preliminary DFST, and
   filter the plurality of candidate DFSTs based on non-DFST edges of each of the plurality of candidate DFSTs to obtain the plurality of DFSTs.

5. The network device of claim 1, wherein the dependency graph is a cyclic dependency graph.

6. The network device of claim 1, wherein the processing circuitry is configured to,
   compute a plurality of groups of edges and nodes, and
   select the set of groups of edges and nodes from the plurality of groups of edges and nodes based on a network service completion time associated with each group of edges and nodes in the plurality of groups of edges and nodes.

7. The network device of claim 6, wherein the processing circuitry is configured to
   generate an ordered list of nodes based on a topological order of nodes in the DFST,
   partition the ordered list of nodes into at least two disjoint sets such that (i) a weight of edges in each of the at least two disjoint sets is less than or equal to a threshold memory capacity, and (ii) a number of memory access operations associated with the edges included in each of the at least two disjoint sets is less than a number of memory access ports in a target memory, and
   compute at least a first of the plurality of groups of edges and nodes based on the at least two disjoint sets.

8. A method for allocating memory bandwidth based on a dependency graph included in a request to allocate memory bandwidth to a set of tasks, the method comprising:
   determining a depth first search tree (DFST) based on the dependency graph;
   determining a set of groups of edges and nodes in the dependency graph based on the DFST; and
   allocating the memory bandwidth to the set of tasks by allocating the memory bandwidth to edges included in the set of groups of edges and nodes.

9. The method of claim 8, wherein the dependency graph includes annotations of characteristics and metadata.

10. The method of claim 8, further comprising:
    obtaining a plurality of DFSTs based on the dependency graph, and
    selecting the DFST from the plurality of DFSTs based on a number of non-DFST edges in each of the plurality of DFSTs.

11. The method of claim 10, wherein the obtaining comprises:
    generating a preliminary DFST based on the dependency graph,
    performing exchanges of edges of the preliminary DFST to generate a plurality of candidate DFSTs; and wherein
    filtering the plurality of candidate DFSTs based on non-DFST edges of each of the plurality of candidate DFSTs to obtain the plurality of DFSTs.

12. The method of claim 8, wherein the dependency graph is a cyclic dependency graph.

13. The method of claim 8, further comprising:
    computing a plurality of groups of edges and nodes; and
    selecting the set of groups of edges and nodes from the plurality of groups of edges and nodes based on a network service completion time associated with each group of edges and nodes in the plurality of groups of edges and nodes.

14. The method of claim 13, further comprising:
    generating an ordered list of nodes based on a topological order of nodes in the DFST;

partitioning the ordered list of nodes into at least two disjoint sets such that (i) a weight of edges in each of the at least two disjoint sets is less than or equal to a threshold memory capacity, and (ii) a number of memory access operations associated with the edges included in each of the at least two disjoint sets is less than a number of memory access ports in a target memory; and computing at least a first of the plurality of groups of edges and nodes based on the at least two disjoint sets.

15. A non-transitory computer-readable storage medium storing computer-readable instructions that, when executed, cause one or more processors at a network device to perform a method for allocating memory bandwidth based on a dependency graph included in a request to allocate memory bandwidth to a set of tasks, the method comprising:

determining a depth first search tree (DFST) based on the dependency graph;

determining a set of groups of edges and nodes in the dependency graph based on the DFST; and allocating the memory bandwidth to the set of tasks by allocating the memory bandwidth to edges included in the set of groups of edges and nodes.

16. The non-transitory computer-readable storage medium of claim 15, wherein the method further comprises:

obtaining a plurality of DFSTs based on the dependency graph, and selecting the DFST from the plurality of DFSTs based on a number of non-DFST edges in each of the plurality of DFSTs.

17. The non-transitory computer-readable storage medium of claim 16, wherein the obtaining comprises:

generating a preliminary DFST based on the dependency graph, performing exchanges of edges of the preliminary DFST to generate a plurality of candidate DFSTs; and wherein filtering the plurality of candidate DFSTs based on non-DFST edges of each of the plurality of candidate DFSTs to obtain the plurality of DFSTs.

18. The non-transitory computer-readable storage medium of claim 15, wherein the dependency graph is a cyclic dependency graph.

19. The non-transitory computer-readable storage medium of claim 15, wherein the method further comprises:

computing a plurality of groups of edges and nodes; and selecting the set of groups of edges and nodes from the plurality of groups of edges and nodes based on a network service completion time associated with each group of edges and nodes in the plurality of groups of edges and nodes.

20. The non-transitory computer-readable storage medium of claim 19, wherein the method further comprises:

generating an ordered list of nodes based on a topological order of nodes in the DFST;

partitioning the ordered list of nodes into at least two disjoint sets such that (i) a weight of edges in each of the at least two disjoint sets is less than or equal to a threshold memory capacity, and (ii) a number of memory access operations associated with the edges included in each of the at least two disjoint sets is less than a number of memory access ports in a target memory; and computing at least a first of the plurality of groups of edges and nodes based on the at least two disjoint sets.

* * * * *